(12) United States Patent
Moors et al.

(10) Patent No.: US 8,349,976 B2
(45) Date of Patent: Jan. 8, 2013

(54) COPOLYMERS CONTAINING PERFLUOROALKYL GROUPS AND AQUEOUS DISPERSIONS THEREOF

(75) Inventors: Rolf Moors, Bonstetten (DE); Wilhelm Artner, Motzenhofer (DE); Isabella Rettenbacher, Gersthofen (DE); Edeltraud Schidek, Augsburg (DE)

(73) Assignee: Huntsman Textile Effects (Germany) GmbH, Langweid am Lech (DE)

( * ) Notice: Subject to any disclaimer, the term of this patent is extended or adjusted under 35 U.S.C. 154(b) by 329 days.

(21) Appl. No.: 12/666,513

(22) PCT Filed: May 14, 2008

(86) PCT No.: PCT/EP2008/003845
§ 371 (c)(1),
(2), (4) Date: Dec. 23, 2009

(87) PCT Pub. No.: WO2009/000370
PCT Pub. Date: Dec. 13, 2008

(65) Prior Publication Data
US 2010/0193724 A1 Aug. 5, 2010

(30) Foreign Application Priority Data
Jun. 27, 2007 (EP) .................................. 07012551

(51) Int. Cl.
*C08F 20/24* (2006.01)

(52) U.S. Cl. ..... 526/224; 526/245; 526/304; 526/307.5; 526/307.7; 526/308; 526/320; 526/329.4; 526/329.5; 526/343

(58) Field of Classification Search .................. 526/245, 526/224, 304, 307.5, 307.7, 308, 320, 329.4, 526/329.5, 343
See application file for complete search history.

(56) References Cited

U.S. PATENT DOCUMENTS

| | | | | |
|---|---|---|---|---|
| 3,491,169 | A * | 1/1970 | Raynolds et al. | 525/160 |
| 3,645,900 | A * | 2/1972 | Ohm et al. | 428/379 |
| 3,849,521 | A | 11/1974 | Kirimoto et al. | |
| 4,060,681 | A | 11/1977 | Kleiner et al. | |
| 4,296,224 | A * | 10/1981 | Fukui et al. | 526/243 |
| 4,742,140 | A | 5/1988 | Greenwood et al. | |
| 5,387,640 | A | 2/1995 | Michels et al. | |
| 6,326,447 | B1 * | 12/2001 | Fitzgerald | 526/245 |
| 6,479,605 | B1 * | 11/2002 | Franchina | 526/245 |
| 6,624,268 | B1 * | 9/2003 | Maekawa et al. | 526/245 |
| 7,976,583 | B2 * | 7/2011 | Goetz et al. | 8/115.51 |
| 2002/0052457 | A1 * | 5/2002 | Fitzgerald | 526/245 |
| 2004/0075074 | A1 | 4/2004 | Kubota et al. | |
| 2010/0183889 | A1 * | 7/2010 | Dams et al. | 428/457 |

OTHER PUBLICATIONS

Inda, Standard Test WSP 80.8(05), Standard Test Method for Alcohol Repellency of Nonwoven Fabrics, pp. 1-5, USA (2008).

* cited by examiner

*Primary Examiner* — Nicole M Buie-Hatcher

(57) ABSTRACT

Copolymers which are composed of at least 4 monomers, including (meth)acrylate compounds containing perfluoroalkyl groups, are suitable for the treatment of fiber materials. The copolymers are usually used here in the form of aqueous dispersions. The fiber materials are in particular fabrics, for example made of polyolefin. Treatment with the copolymers imparts to them oil- and water-repellent properties and also repellent properties toward low molecular weight alcohols.

2 Claims, No Drawings

COPOLYMERS CONTAINING PERFLUOROALKYL GROUPS AND AQUEOUS DISPERSIONS THEREOF

CROSS REFERENCE TO RELATED APPLICATIONS

This application is the National Phase of International Application PCT/EP2008/003845 filed May 14, 2008 which designated the U.S. and which claims priority to European Patent Application (EP) 07012551.3 filed Jun. 27, 2007. The noted applications are incorporated herein by reference.

TECHNICAL FIELD

The invention relates to novel copolymers which contain perfluoroalkyl groups ($R_F$). It further relates to aqueous dispersions of these copolymers and their use.

BACKGROUND ART

Copolymers which contain perfluoroalkyl groups ($R_F$) and the use of these copolymers for the treatment of fiber materials are known. This is evident, for example, from FR-A 2 213 333, DE-A 27 02 632 and EP-A 234 724.

The copolymers known from the prior art and aqueous dispersions thereof have disadvantages as well as advantages. This is true particularly if they are to serve for the treatment of fiber materials made of polyolefins, especially polypropylene. This is because it has been found that relatively high temperatures have to be applied in order to achieve the desired effects on the fiber materials. These effects are, for example, oil-/water-repellent properties and alcohol-repellent properties. Articles made of polypropylene which are to be used in the medical sector are often required to effectively repel low molecular weight alcohols such as isopropanol. For other fields of use, such as, for example, in the automobile sector, on the other hand, it is not the repellent effect toward alcohols that is of central importance, but an oil-repellent effect. This is also true for fiber materials made of other polymers, such as, for example, polyester and polyester/cellulose mixtures. In order to achieve such alcohol-repellent and/or oil-/water-repellent properties, the fiber materials treated with $R_F$ copolymers have to be subjected to elevated temperatures. In the case of $R_F$ copolymers known from the prior art, temperatures of more than 130 to 140° C. are often required for this. These copolymers are consequently unsuitable, or suitable only to a limited extent, for fiber materials which are damaged at the specified temperatures. Particularly in the case of fiber materials made of polypropylene, there is the risk that, following treatment with known $R_F$ copolymers and heating to more than 130° C., the polypropylene material is damaged.

DISCLOSURE OF INVENTION

The object of the present invention was to provide novel copolymers containing perfluoroalkyl groups, and aqueous dispersions thereof, where it should be possible to heat the fiber materials treated with the copolymers to temperatures of not more than 130 to 140° C. and nevertheless achieve excellent properties with regard to repellency of oil, water and low molecular weight alcohols.

The object was achieved by a copolymer which comprises copolymerized units which originate from monomers of formulae a) to d)

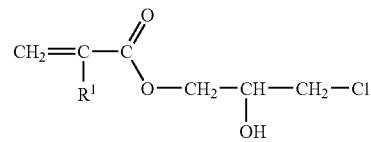

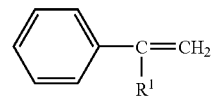

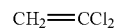

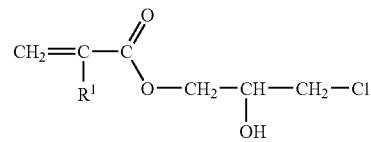

where all of the radicals $R^1$, independently of one another, are hydrogen or the methyl group, $R_F$ is a perfluoroalkyl radical of the formula

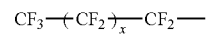

in which x is a number from 2 to 22, n is a number from 2 to 6, where n preferably has the value 2, and by an aqueous dispersion of such a copolymer.

It is possible to treat fiber materials with aqueous dispersions of copolymers according to the invention, to optionally dry them in a separate operation and then to heat them to a temperature of from 80° C. to 140° C. and in so doing to achieve excellent oil-/water-repellent properties and also excellent properties with regard to repellency of low molecular weight alcohols such as, in particular, isopropanol. This is of great importance if the fiber materials, e.g. nonwovens, consist of polyolefins, in particular polypropylene, and are to be used in the medical sector. In addition, the oil-repellent effect is, inter alia, of importance if the fiber materials, e.g. of polyester or polyester mixtures are to be used in the automobile sector. The copolymers according to the invention are thus highly suitable for processes (low-cure methods) which have to proceed at temperatures of not more than 140° C. in order to avoid damage to the fiber material, e.g. made of polypropylene. For the person skilled in the art, this is an unexpected and surprising advantage over copolymers known from the prior art, both as regards economic and also ecological aspects. Furthermore, it has been found that when using copolymers according to the invention, it is possible to impart an exceptionally soft feel to the treated fiber materials.

On account of the applicability at relatively low temperatures, a further advantage of copolymers according to the invention is also that treatment of fiber materials with these copolymers makes it possible to impart favorable properties with regard to temperature-induced yellowing and thermomigration to fiber materials.

Copolymers according to the invention comprise copolymerized units which originate from monomers a) to d).

a)

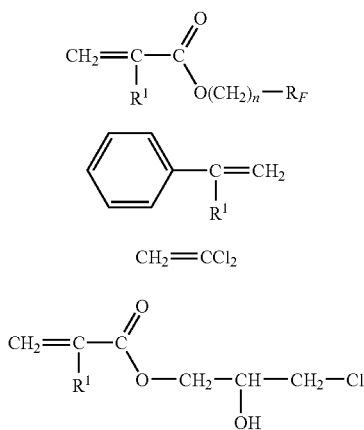

b)

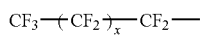

c)

CH$_2$=CCl$_2$ d)

All 4 of these units must be present in order to achieve the advantages of the copolymers according to the invention.

In formulae a) to d), all of the radicals R$^1$, independently of one another, are hydrogen or the methyl group, R$_F$ is a perfluoroalkyl radical of the formula $$CF_3-(CF_2)_x-CF_2-$$

in which x is a number from 2 to 22, n is a number from 2 to 6, where n preferably has the value 2.

The copolymers do not have to be composed in each case just of a single type of monomers a) to d). Rather, in their preparation, it is also possible that mixtures of monomers a) and/or monomers b) and/or monomers d) have been used, e.g. mixtures whose components differ in the chain length of R$_F$ or in the nature of the radical R$^1$; e.g. mixtures of acrylates and methacrylates can be used as monomers a) and/or as monomers d), and styrene, α-methylstyrene or a mixture of these two monomers can be used as monomer b). The same statements also apply with regard to the merely optional units which originate from monomers e) to h), which are described below. Of suitability here are primarily mixtures with different chain lengths of the radicals C$_t$H$_{2t+1}$.

In monomer a), R$_F$ is preferably a perfluoroalkyl radical having 8 to 18 carbon atoms. In monomer b), the radical R$^1$ is preferably hydrogen. Monomer b) is thus preferably styrene.

Depending on the intended use of the treated fiber materials, it may be advantageous if the copolymers according to the invention additionally comprise one or more copolymerized units which originate from monomers e) to h)

e)

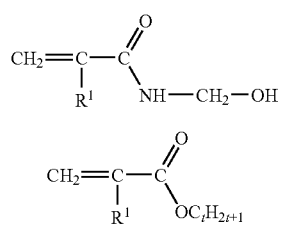

f)

g)

h)

C$_t$H$_{2t+1}$—SH in which R$^1$ has the meaning given in claim 1 and t is a number from 8 to 24.

In formula f), the radical C$_t$H$_{2t+1}$ is preferably an unbranched hydrocarbon radical having 12 to 20 carbon atoms.

The advantages that can be obtained when additionally using monomers of formulae e), f) and g) are that, in the case of the use of a monomer e), better wetting of the copolymers according to the invention can be achieved, either with themselves or with fibers, such as, for example, cellulose fibers; in the case of the use of a monomer f), better soft feel of the fiber materials treated with copolymers according to the invention can be achieved, as well as better water-repellent properties; in the case of the use of monomers g), better oil-repellent properties of finished fiber materials can be achieved.

Preferably, the radicals C$_t$H$_{2t+1}$, and C$_4$H$_9$ in monomers f) and g) are linear alkyl radicals.

Monomer h) is highly suitable as component in the preparation of the copolymers. It serves as chain terminator during the free-radical polymerization.

Monomers a) to h) are customary, commercially available products and/or can be prepared by generally known methods. Monomer e), for example, can be prepared by reacting (meth)acrylamide with formaldehyde, monomer d) can be acquired from SHIN-NAKAMURA CHEMICALS Co., Ltd., or from Aldrich Chemicals (CAS: 13159-52-9); monomer a) can be acquired from Du Pont.

The preparation of the copolymers according to the invention from monomers a) to d), optionally with simultaneous use of one or more monomers e) to h), can take place by generally known methods. Usually, the copolymerization proceeds as free-radical polymerization at temperatures in the range from 20° C. to 70° C. either in a suitable solvent or dispersant or without use of a solvent/dispersant. If the copolymers according to the invention are to be used in the form of aqueous dispersions for the treatment of fiber materials, it is often advantageous to prepare them in aqueous medium as dispersant. Known dispersants are usually co-used here. For example, ethoxylated alcohols, optionally in combination with customary cation-active surfactants, are suitable.

The free-radical copolymerization for preparing copolymers according to the invention normally proceeds using known compounds which, at elevated temperatures, form free radicals which then initiate the copolymerization. Examples of suitable free-radical formers are standard commercial azo compounds, sulfinic acids and peroxides and salts thereof.

During the preparation of the copolymers according to the invention, monomers a) to g) are preferably used in amounts such that the formed copolymers comprise the units originating from monomers a) to g) in the following relative amounts:

35 to 55 mol % of units originating from a), in particular 42 to 50 mol %

8 to 55 mol % of units originating from b), in particular 20 to 45 mol %

8 to 42 mol % of units originating from c), in particular 8 to 32 mol %

4 to 18 mol % of units originating from d), in particular 4 to 12 mol %

3 to 16 mol % of units originating from e), in particular 5 to 12 mol %

4 to 16 mol % of units originating from f), in particular 6 to 13 mol %

3 to 16 mol % of units originating from g), in particular 5 to 11 mol %.

The units originating from monomer h) are preferably present in the copolymer in an amount from 0.5 to 1.5% by weight.

The aforementioned designation "mol %" of units originating from a) is characterized according to the following example:

If a copolymer contains 10 units which originate from monomer a), and in addition a total of 50 units which originate from monomers b) to g), then it contains $$\frac{10}{10+50} \times 100 \text{ mol \%},$$

i.e. 16.6 mol % of units originating from a).

Analogous statements apply for the fractions of units originating from monomers b) to g).

The individual amounts of monomers a) to g) used are preferably chosen here such that the copolymer has a fluorine content in the range from 30 to 50% by weight.

The copolymers according to the invention are particularly well suited for the treatment of fiber materials. Preferably, they are used for this purpose in the form of aqueous dispersions. These aqueous dispersions comprise a copolymer according to the invention or a mixture of such copolymers, preferably in a concentration in the range from 5 to 50% by weight, particularly preferably from 5 to 25% by weight. Prior to being used for fiber treatment, these dispersions are expediently diluted with water. In addition, the dispersions usually comprise known surface-active products as dispersants. Moreover, they can also comprise further constituents which are desired for the treatment of fiber materials, such as, for example, flame retardants, polyorganosiloxanes etc. These further constituents can be selected from the groups of products known to the person skilled in the art.

As mentioned above, the preparation of the aqueous dispersions can, for example, take place by carrying out the copolymerization of the monomers in an aqueous medium in the presence of dispersants. If the copolymers are prepared in another way, then they can subsequently be dispersed in water with co-use of dispersants, which is optionally followed by mechanical homogenization at room temperature or elevated temperature. The fiber materials which are treated with copolymers according to the invention or their aqueous dispersions are preferably fabrics in the form of wovens, knits or nonwovens.

The copolymers according to the invention are particularly well suited for the treatment of fabrics which are nonwovens made of polyolefins, in particular polypropylene.

Polypropylene materials treated in such a way can be used advantageously in the medical sector.

Treatment of the fiber materials with aqueous dispersions of copolymers according to the invention leads to excellent oil- and water-repellent properties also in the course of low-cure methods which are carried out at a relatively low temperature. In addition, good repellent effects toward low molecular weight alcohols such as isopropanol can be achieved on the fiber materials, and, if desired, a pleasant soft feel of the materials.

The invention will now be illustrated by working examples.

EXAMPLE 1 (ACCORDING TO THE INVENTION)

The following products were mixed together solution of 20 g of an ethoxylated isotridecyl alcohol (12 EO) in 330 g of water 55 g of dipropylene glycol 170 g of an acrylate ester containing perfluoroalkyl groups in the alcohol component (ZONYL TAN, Du Pont), corresponding to monomer a) according to claim 1

15 g of methacrylate of a relatively long-chain alcohol 2 g of n-dodecyl mercaptan (monomer h) according to claim 2

19 g of a 10% strength by weight solution on N-methylolacrylamide in water (monomer e) according to claim 2

5 g of n-butyl acrylate (monomer g) according to claim 2

5 g of a diester of a dihydric alcohol (Eastman TXIB)

10 g of styrene (monomer b) according to claim 1

11 g of a silicone oil (silicone oil L 080 from Wacker)

5 g of 3-chloro-2-hydroxypropyl methacrylate (monomer d) according to claim 1)

The resulting mixture was stirred at a temperature of at most 60° C. for 1 minute and then subjected to a high-pressure homogenization at 250 bar and 60° C. After cooling, the resulting mixture was transferred to an autoclave, then firstly 3 g of an azo compound (initiator for free-radical polymerization) were added, followed by 10 g of vinylidene chloride (monomer c) according to claim 1.

The mixture was then heated to 65° C. in the autoclave within 30 minutes and stirred at this temperature for 8 hours.

This gave a stable transparent dispersion with a fluorine content of 13.9% by weight.

EXAMPLE 2 (ACCORDING TO THE INVENTION)

Example 1 was repeated, the only difference being that 15 g of styrene were used instead of 10 g.

EXAMPLE 3 (ACCORDING TO THE INVENTION)

Example 1 was repeated, the only difference being that 20 g of styrene were used instead of 10 g.

EXAMPLE 4 (COMPARATIVE EXAMPLE NOT ACCORDING TO THE INVENTION)

The process was as in Example 1 but without using vinylidene chloride (monomer c) according to claim 1.

EXAMPLE 5 (COMPARATIVE EXAMPLE NOT ACCORDING TO THE INVENTION)

The procedure was as in Example 1 but without using styrene (monomer b) according to claim 1.

EXAMPLE 6 (COMPARATIVE EXAMPLE NOT ACCORDING TO THE INVENTION)

The procedure was as in Example 1, but without using the chlorohydroxypropyl methacrylate (monomer d) according to claim 1 specified therein.

EXAMPLE 7 (COMPARATIVE EXAMPLE NOT ACCORDING TO THE INVENTION)

A copolymer was prepared in accordance with Example 1 of EP-A 234 724.

During the preparation of this copolymer, no monomer b) and no monomer d) according to the aforementioned type was used.

To prepare the copolymer,
10 g of ethoxylated isotridecyl alcohol (15 EO)
1 g of cationic dispersant
32 g of stearyl methacrylate
1 g of concentrated acetic acid solution
116 g of acrylate ester containing perfluoroalkyl groups (Zonyl TAN as in Example 1)
10 g of N-methylolacrylamide
2 g of n-dodecyl mercaptan
and
590 g of water
were mixed together and stirred at 50° C., then subjected to high-pressure homogenization at 100 to 150 bar and at a temperature of 45-50° C.

After flushing with nitrogen and adding 50 g of vinylidene chloride, 1.6 g of free-radical initiator and 10 g of water, the mixture was heated, during which the temperature increased slowly over the course of 12 hours from 20° C. to 50° C. A milky dispersion was obtained.

EXAMPLE 8 (ACCORDING TO THE INVENTION)

Example 7 was repeated, with 7 g of styrene (monomer b)) and 3.5 g of 3-chloro-2-hydroxypropyl methacrylate (monomer d)) also being added to the mixture before the high-pressure homogenization.

The dispersions obtained in Examples 1 to 8 were used to treat materials made of polyester taffeta in each case by means of a padding process. The concentrations of the individual dispersions in the aqueous padding liquors were adjusted such that each liquor had a fluorine content of about 1.2 g of F/l. Furthermore, prior to treating the polyester taffeta, 1 g/l of 60% strength acetic acid and 5 g/l of a wetting agent were also added to each liquor.

During the padding, the individual samples absorbed about 40-60% of their own weight of liquor, these figures referring to values after squeezing.

The taffeta samples were then dried for 8 minutes at 40° C. and cured for 1 minute at 60° C. The so-called "spray value", the water absorption in %, the "beading effect" were determined on the resulting samples, and the EDANA test was also carried out.

The following methods were used here:
1. EDANA Test
    This test gives information about which alcohol-repelling properties textiles made of fiber materials have toward low molecular weight alcohols. In the case of the present samples from the 8 examples, the test was carried out as described in the paper "*Standard Test: WSP* 80.8 (05), *Standard Test Method for Alcohol Repellency of Nonwoven Fabrics*", edition 2005, from the "European Disposables and Nonwovens Association". The description of this test method is given in "World Wide Strategic Partner: Standard Test Methods for Nonwovens Industry. Author: INDA and EDANA". The test solutions used were mixtures of isopropanol/water with varying mixing ratios. The result of the test is expressed in grades from 0 to 10, with higher grades indicating more effective repellency of isopropanol.
2. Water Absorption in %
    Determination is made here of how much % by weight of water the finished textile sample absorbs under the conditions of the test method "Bundesmann: Rain, DIN, EN 29865=ISO 9865", (edition November 1993). Higher values for the results thus indicate greater water absorption, i.e. poorer water-repellent effect.
3. Beading Effect
    This test is likewise carried out according to the method described under No. 2 (Bundesmann DIN ISO). The results are expressed in grades from 1 to 5, with grade 5 being the best and grade 1 being the worst repellent effect toward water.
4. "Spray Test"
    This test is carried out according to the method stated in AATCC™ 22/ISO 4920 (2005). The principle of the method consists in spraying the sample with water and visually assessing the wetting.
    The results are expressed in grades, with 100 being the best and 0 being the worst evaluation.

The results determined on the samples of Examples 1 to 8 are given in the table below. The spray test was carried out three times, and in the case of the beading test, a total of 3 values were determined at different time points, hence in each case 3 grades for each sample.

| Example | EDANA | Water absorption (% by wt.) | Beading effect grade | Spray grade |
|---------|-------|------------------------------|----------------------|-------------|
| 1 | 1-2 | 18 | 5/5/5 | 100/100/100 |
| 2 | 3-4 | 15 | 4/4/4 | 100/100/100 |
| 3 | 3-4 | 6  | 5/5/5 | 100/100/100 |
| 4 | 0   | 31 | 1/1/1 | 50/0/0 |
| 5 | 0-1 | 24 | 1/1/1 | 80/70/50 |
| 6 | 1   | 22 | 1/1/1 | 70/50/50 |
| 7 | 0   | 20 | 1/1/1 | 70/50/0 |
| 8 | 1-2 | 12 | 5/5/5 | 100/100/100 |

The table shows that the dispersions obtained in Examples 1, 2, 3 and 8 according to the invention lead to more effective water/alcohol repellency of the finished taffeta samples than the dispersions of Examples 4 to 7 not according to the invention.

The invention claimed is:
1. A copolymer which comprises copolymerized units which originate from monomers of formulae a) to g) in the following relative amounts

35-55 mol % of units originating from a) 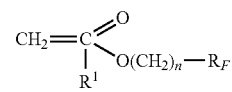

| | |
|---|---|
| 8-55 mol % of units originating from b) | 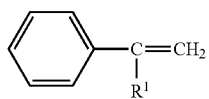 |
| 8-42 mol % of units originating from c) | CH$_2$=CCl$_2$ |
| 4-18 mol % of units originating from d) | 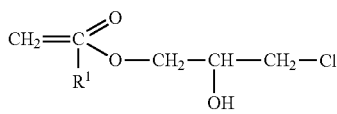 |
| 3-16 mol % of units originating from e) | 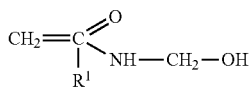 |
| 4-16 mol % of units originating from f) | 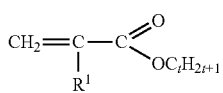 |
| 3-16 mol % of units, originating from g) | 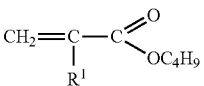 | where all of the radicals R$^1$, independently of one another, are hydrogen or a methyl group, R$_F$ is a perfluoroalkyl radical of the formula

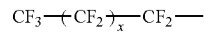

in which x is a number from 2 to 22, t is a number from 8 to 24, and n is a number from 2 to 6.

2. The copolymer as claimed in claim 1, characterized in that it further comprises 0.5 to 1.5 mol % of units originating from chain terminator C$_t$H$_{2t+1}$—SH.

\* \* \* \* \*